United States Patent [19]

Rifat

[11] 4,318,288
[45] Mar. 9, 1982

[54] STEERING COLUMN LOCK

[76] Inventor: Sultan A. Rifat, 159 Gelston Ave., Brooklyn, N.Y. 11209

[21] Appl. No.: 34,336

[22] Filed: Apr. 30, 1979

[51] Int. Cl.³ .................. B60R 25/02; E05B 25/00; E05B 47/06; E05B 65/12
[52] U.S. Cl. ............................ 70/252; 70/186; 70/278; 70/282; 70/283; 70/284; 70/312; 70/361; 70/425; 70/DIG. 20
[58] Field of Search ............... 70/252, 278, 282, 283, 70/285, 186, 185, 184, 361, 355, 347, 312, 284, DIG. 20, DIG. 27, 425, 277, 279; 180/287; 292/144

[56] References Cited

U.S. PATENT DOCUMENTS

| | | | |
|---|---|---|---|
| 903,476 | 11/1908 | Jansen | 70/185 |
| 1,095,569 | 5/1914 | Glenn et al. | 70/185 |
| 1,118,580 | 11/1914 | Pohler | 70/185 |
| 1,326,149 | 12/1919 | McKinnie | |
| 1,342,728 | 6/1920 | Welch | 70/252 |
| 1,378,335 | 5/1921 | Edgerton et al. | |
| 1,395,636 | 11/1921 | Giles | 70/185 |
| 1,413,427 | 4/1922 | Riggins | 70/312 |
| 1,970,541 | 8/1934 | Bolognini | |
| 2,006,104 | 6/1935 | Knapper | |
| 2,148,609 | 2/1939 | Edwards | 70/252 |
| 2,844,671 | 7/1958 | Goral | 70/278 X |
| 2,890,581 | 6/1959 | Lewis | 70/252 X |
| 2,910,859 | 11/1959 | Allen et al. | 70/283 X |
| 2,964,935 | 12/1960 | Lombardi | 70/252 |
| 3,618,009 | 11/1971 | Lee | 180/287 X |
| 3,680,355 | 8/1972 | Onishi | 70/252 |

FOREIGN PATENT DOCUMENTS

| | | | |
|---|---|---|---|
| 202058 | 7/1920 | Canada | 70/186 |
| 380111 | 9/1923 | Fed. Rep. of Germany | 70/279 |
| 380976 | 9/1923 | Fed. Rep. of Germany | 70/186 |
| 464850 | 8/1928 | Fed. Rep. of Germany | 70/312 |
| 543863 | 2/1932 | Fed. Rep. of Germany | 70/186 |
| 2261372 | 7/1974 | Fed. Rep. of Germany | 70/252 |
| 456440 | 6/1913 | France | 70/282 |
| 521821 | 7/1921 | France | 70/185 |
| 25745 | 1/1923 | France | 70/186 |
| 614989 | 10/1926 | France | 70/186 |
| 787499 | 9/1935 | France | 70/278 |
| 476777 | 12/1952 | Italy | 70/184 |
| 477608 | 1/1953 | Italy | 70/278 |
| 585916 | 11/1958 | Italy | 180/287 |
| 144476 | 1/1920 | United Kingdom | 70/282 |

Primary Examiner—Richard E. Moore
Assistant Examiner—Carl F. Pietruszka
Attorney, Agent, or Firm—Hubbell, Cohen, Stiefel & Gross

[57] ABSTRACT

A tamper-resistant steering column lock incorporating an improved combination lock is disclosed. The improved combination lock includes an array of discs, each having an electrically conductive member extending therethrough. The disc at one end of the array is connected to the active terminal of the vehicle's electrical system and the disc at the other end of the array is grounded. When the discs are rotated to align the electrically conductive members, a circuit is completed to a solenoid or the like which regulates movement of a locking bolt between its locked and unlocked positions.

6 Claims, 12 Drawing Figures

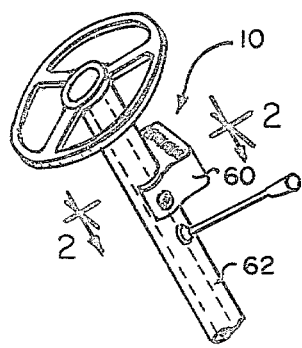
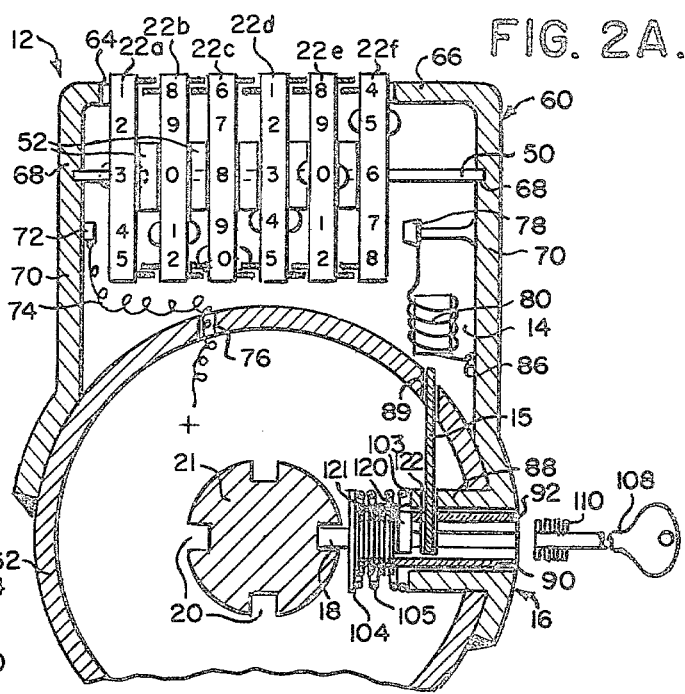
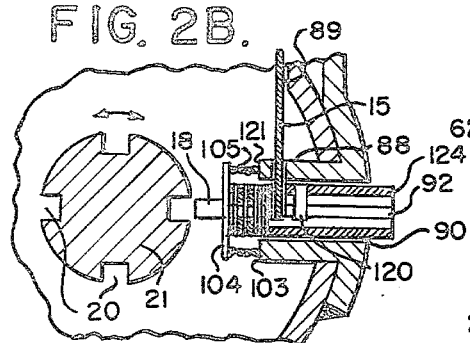
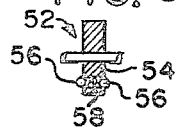
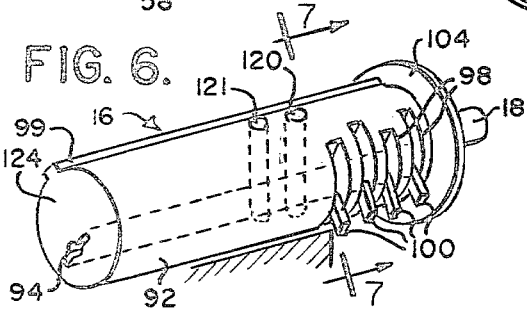
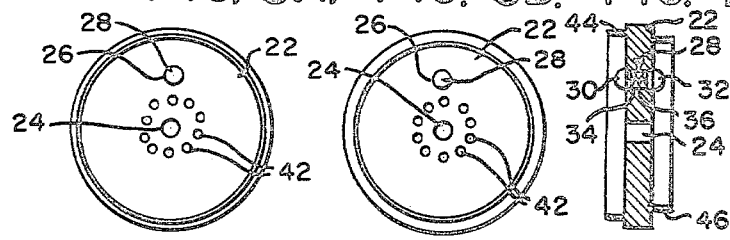
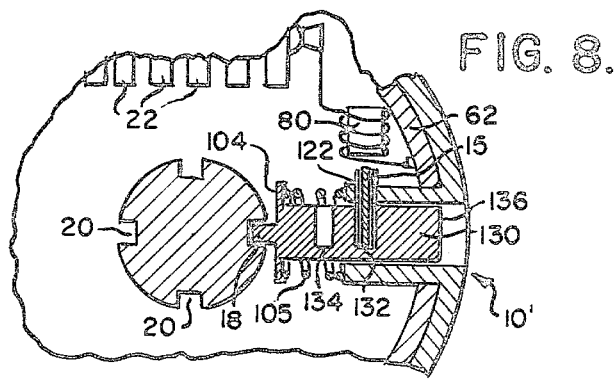
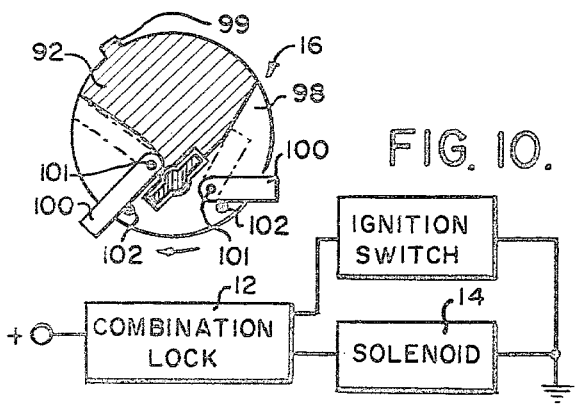
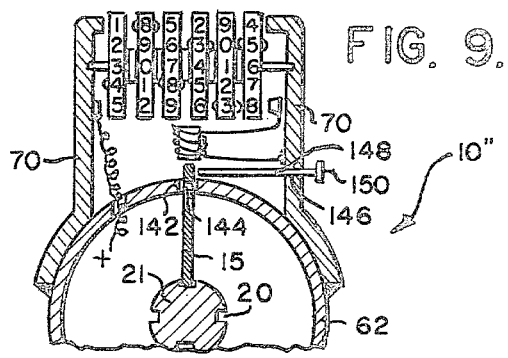

STEERING COLUMN LOCK

BACKGROUND OF THE INVENTION

1. Field of the Invention

This invention pertains to combination locks generally and also to steering column locks operable by a combination lock.

2. Statement of the Prior Art

Others have suggested the use of steering column locks activatable by a combination lock. For example, U.S. Pat. No. 2,006,104 discloses a steering column lock comprising a combination lock which operates a locking bolt. In the locked position, the locking bolt extends through the outer casing of the steering column and into one of a plurality of notches provided in a locking cylinder secured about the steering shaft. The steering shaft is freed for rotation relative to the casing by rotating the combination lock according to the proper combination which draws the locking bolt out of the notches.

U.S. Pat. No. 2,964,935 discloses another steering column lock operable by a combination lock. As disclosed in the patent, the steering shaft is held against rotation relative to the casing by a pair of locking arms, each having a plurality of teeth which mate with corresponding teeth on the steering shaft. The locking arms are pivotally secured to one end of a frame which is secured to a housing for movement relative to the steering shaft. The other end of the frame is secured to an armature. The armature is partially disposed in a solenoid which is energized by the battery of the vehicle through a switch operable by the combination lock. When the solenoid is energized, the armature and the frame are pulled toward the solenoid. This pivots the locking arms away from the steering shaft thereby freeing it for rotation relative to the casing.

Still other steering column locks operable by combination locks are disclosed in U.S. Pat. Nos. 1,378,335, 1,826,235, 1,970,541, 1,326,149, 1,948,913, 1,976,724 and 3,794,796.

SUMMARY OF THE INVENTION

According to the invention, I have developed an improved locking mechanism for locking the steering shaft against rotation relative to the casing, the mechanism being of the type wherein locking is effected by a locking bolt which extends through the outer casing into one of a plurality of notches in the shaft. The locking mechanism of the invention includes a combination lock comprising an array of discs rotatably secured about a shaft, each of the discs having an electrically conducting member extending axially therethrough. The combination lock is secured in a housing having a pair of contacts, one disposed on either side of the array. One contact is connected to the active terminal of the car battery and the other contact is connected to one end of a solenoid. The other end of the solenoid is grounded. It will thus be apparent that when the discs are rotated according to the proper combination to align the electrically conducting members with the contacts, a conductive path is established from the car battery to the solenoid.

In a basic embodiment of the invention, an armature partially disposed in the solenoid extends through the outer casing of the steering column perpendicular to the steering shaft. The solenoid is arranged relative to the shaft such that when the solenoid is deenergized, the armature falls under the influence of gravity into one of the notches in the shaft. Because the armature also extends through an aperture in the outer casing, the steering shaft is thereby locked against rotation. It will thus be apparent that in the basic embodiment, the armature serves as the locking bolt. When the discs are rotated according to the proper combination thereby energizing the solenoid, the armature is drawn out of the notch in the shaft thus freeing it for rotation. Preferably, a bolt extending through the housing perpendicular to the armature is movable into a hole in the armature when the armature is in the unlocked position. This prevents the armature from falling into one of the notches in the shaft in the event the coil is deenergized due to accidental movement of the discs during operation of the vehicle.

In a preferred locking mechanism according to the invention, an axially movable key-operated lock having a locking bolt at the rear end thereof is secured in a sleeve in the outer casing such that the bolt extends perpendicularly to the shaft. In the locked position, the locking bolt is disposed in one of the notches in the shaft thereby preventing rotation of the shaft relative to the casing. The lock is provided with a plurality of levers which, in the locked position, abut the face of the sleeve nearest the shaft thereby preventing axial movement of the lock to retract the locking bolt from the notch. When the proper key is used, the levers are drawn into the body of the lock thus freeing the lock for axial movement to the unlocked position wherein the locking bolt is retracted from the shaft. The preferred locking mechanism includes means for biasing the key-operated lock to the unlocked position.

The body of the key-operated lock is provided with a pair of radially extending holes which communicate with the keyway. The holes are spaced such that one of the holes is aligned with a thru aperture in the sleeve when the key-operated lock is in the locked position and the other hole is aligned with the thru aperture when the key-operated lock is in the unlocked position. The armature of the solenoid described above in connection with the basic embodiment is arranged in alignment with the thru aperture in the sleeve. When the locking bolt is in its locked position and the solenoid is deenergized, the armature moves under the influence of gravity through the sleeve and into the aligned hole in the body of the lock. It will thus be apparent that in the preferred embodiment, the armature serves both as a shutter to prevent the unauthorized insertion of a key or lock picking device into the keyway and as a supplement to the levers. To unlock the steering shaft, the discs are rotated according to the proper combination thereby energizing the solenoid and drawing the armature out of the body of the lock. The key may then be inserted for freeing the lock for axial movement to retract the locking bolt as is more fully explained above. To prevent accidental movement of the locking bolt back to its locking position, the discs may then be rotated to deenergize the solenoid whereupon the armature will move under the influence of gravity through the sleeve and into the other hole in the body of the key-operated lock. Preferably, the discs are provided with annular flanges on both faces thereof to prevent the insertion of unauthorized devices between the discs.

In a modification of the preferred locking mechanism, the key operated lock is replaced by a cylindrical plug and the armature alone blocks movement of the locking bolt to the unlocked position.

Further features and advantages of the steering column lock according to the present invention will be more fully apparent from the following detailed description and annexed drawings of the preferred embodiments thereof.

BRIEF DESCRIPTION OF THE DRAWINGS

In the drawings:

FIG. 1 is a perspective view of the preferred steering column lock mounted on the outer casing of the steering column;

FIG. 2A is a view partly in section and partly in elevation taken substantially along the lines 2—2 in FIG. 1 showing the locking bolt in the locked position;

FIG. 2B is a view similar to FIG. 2A but showing the locking bolt in the unlocked position;

FIG. 3A is an elevational view showing one face of a preferred disc;

FIG. 3B is an elevational view showing the other face of the disc;

FIG. 4 is an elevational view, partly in section, of the disc of FIG. 3;

FIG. 5 is a view partly in elevation and partly in section showing a preferred spacer;

FIG. 6 is a perspective view of the preferred key-operated lock for incorporation in the steering column lock of FIG. 1-5;

FIG. 7 is a sectional view taken substantially along the lines 7—7 in FIG. 6 showing the levers in their extended positions (solid lines) and retracted positions (dotted lines);

FIG. 8 is a view similar to FIG. 2A illustrating an alternative embodiment of the steering column lock according to the present invention;

FIG. 9 is another view similar to FIG. 2A illustrating a still further embodiment of a steering column lock according to the present invention; and FIG. 10 is a schematic representation of a circuit wherein the combination lock of the preferred steering column lock is also used to operate the ignition switch.

DETAILED DESCRIPTION OF THE PREFERRED EMBODIMENTS

Referring now to the drawings wherein like numbers represent like parts, FIGS. 1-7 illustrate the preferred embodiment of a steering column lock 10 according to the present invention. As best shown in FIGS. 2A and 2B, the basic components of the lock 10 are a combination lock 12, a solenoid 14 having an armature 15, and a key-operated lock 16 having a locking number 18 at the rear end thereof, the locking member 18 being engageable with one of the notches 20 in the steering column shaft 21.

Referring now to FIGS. 2-5, the combination lock is comprised of a plurality of discs, shown by way of example as six discs 22a-22f, an exemplary disc being illustrated in FIG. 4. For reasons that will be apparent hereinafter, each disc has a preferably centered axial thru hole 24 and an off-center axial thru hole 26 in which an electrically conducting member 28 is disposed. Electrically conducting member 28 preferably comprises a pair of rounded brushes 30, 32 connected by a coil spring 34 and a wire 36. Preferably, a plurality of detents 42, shown by way of example as ten detents, are arranged in circular fashion about the aperture 24 on both faces of the disc, one of the detents on each face being aligned with the conducting member 28. If desired, non-conducting or "dummy" conducting members (not shown) may be distributed about the faces of the discs 22 in alignment with the other detents 42. As shown, annular flanges 44 and 46 are preferably formed on the faces of the disc 22 near its periphery, the flange 44 on one face having a somewhat larger diameter than the flange 46 on the other face.

Referring again to FIGS. 2A and 2B, discs 22 are supported for rotation on a shaft 50 extending through the apertures 24, and a plurality of spacers 52 are fixedly secured about the shaft between each pair of adjacent discs. As best shown in FIG. 5, each spacer 52 has an off-center axial thru hole 54 in which a pair of balls 56 seated on opposite ends of a coil spring 58 are disposed. It will be apparent that as each disc 22 is rotated, the balls 56 in the adjacent spacers 52 will snap in and out of the confronting detents 42. Thus, each disc will have as many positions as there are detents, in this case ten. As shown, the numbers 0-9 corresponding to these ten positions are preferably applied to the peripheries of the discs 22. The peripheries of the discs are also preferably knurled to facilitate rotation.

While the combination lock 12 may be mounted at various locations, such as the dashboard, as best shown in FIGS. 1, 2A and 2B, it is preferably mounted in a substantially rectangular housing 60 secured, as by welding, to the outer casing 62 of the steering column. As will be apparent hereinafter, this location minimizes the possibility of tampering. Housing 60 preferably has a top wall 66, side walls 70 and an open bottom. Opposite ends of the shaft 50 are supported in detents 68 in confronting side walls 70 of the housing 12 such that a portion of the periphery of each of the discs 22 extends through a slot 64 in top wall 66.

A contact 72 is preferably secured to the inside face of one of the walls 70 such that as the disc 22a is rotated, the contact 72 will, upon proper alignment, engage the electrically conducting member 28a. As shown, contact 72 is connected to the DC signal available from the vehicle's electrical system, preferably via a wire 74 which extends through an aperture 76 in the casing 62 provided for this purpose. Another contact 78 is disposed on the opposite side wall 70 for engaging the conducting member 28f when the disc 22f is properly aligned. The contact 78 is connected to one end of the coil 80 of the solenoid 14. As shown, the other end of the coil 80 is grounded at 86 as by direct connection to the housing 60.

Referring now to FIGS. 2A, 2B, 6 and 7 the casing 62 has an inwardly extending annular sleeve 88 defining a cylindrical bore 90 having a longitudinally extending recess (not shown) for receiving the key-operated lock 16. For reasons that will be apparent hereinafter, sleeve 88 has a thru aperture 122 arranged in axial alignment with an aperture 89 in casing 62 and the cylinder defined by the coil 80.

The preferred lock 16 includes a cylindrical body 92 dimensioned for a close fit in sleeve 88. The body 92 has a keyway 94 which communicates with one or more radially extending slots 98, shown by way of example as four radially extending slots, and a rib 99 which seats in the recess in the sleeve 88 to secure the body 92 against rotation relative to sleeve 88. A pair of levers 100 are pivotally secured to the body 92 in each of the slots 98, as by the pins 101. Each lever 100 is pivotable between a locked position wherein its free end protrudes outside the body 92 through the slots 98 (solid lines in FIG. 7), and an unlocked position wherein the lever is fully received inside the body 92 (dotted lines in FIG. 7).

Preferably, the range of movement of the levers 100 in their unlocked positions is limited by the defining walls of the slots 98 and in their locked positions by the pins 102. It will thus be apparent that when the key 108 is inserted in the keyway 94 and rotated in the direction of the arrows in FIG. 7, teeth 110 will pivot levers 100 to their unlocked positions.

As best shown in FIG. 2A, when the levers 100 are in their locked positions, the pair of levers nearest the front of the body 92 abuts the face 103 of the sleeve 88 thereby restricting axial movement of the body 92 to the right in FIG. 2A. As shown, a plate 104 is secured to the back of the body 92 and the locking member 18 is secured to the back of the plate.

A coil spring 105 disposed about body 92 is connected at one end to the plate 104 and at the other end to the face 103 of the sleeve 88. Spring 105 is extended from its rest position when lock 16 is in the locking position. Thus, when the key 108 is fully inserted in keyway 94 and rotated to pivot levers 100 to their unlocked positions, coil spring 105 will move body 92 to the right in FIG. 2A thus retracting locking member 18 from the notch 20. Movement of the body 92 to the right in FIG. 2A is limited by back plate 104 which closely confronts the face 103 of sleeve 88 when the locking member 18 is fully retracted from the notch.

As shown, the body 92 is provided with a pair of spaced radially extending holes 120, 121 between the front of the body 92 and the first pair of levers 100. These holes are arranged such that their axes are parallel with the axis of the aperture 122 in the sleeve 88. Preferably, both holes 120, 121 communicate with keyway 94, although it will be apparent hereinafter that this is only necessary with respect to the hole 120. As shown, the holes 120, 121 are spaced such that the hole 120 is aligned with the aperture 122 when the locking member 18 is in the notch 20, and the hole 121 is aligned with the aperture 122 when the locking member is fully retracted from the notch.

To explain the operation of the lock 10, assume that the conducting members 28 and the contacts 72, 78 are out of alignment and that the armature 15 and locking member 18 are in the positions illustrated in FIG. 2A. To free the shaft 21 for rotation relative to the casing 62, an authorized user, knowning the proper combination, first rotates discs 22 to align the conducting members 28 with the contacts 72, 78. This completes the circuit to the coil 80 thereby establishing a magnetic field which draws the armature 15 out of aperture 122 and aligned hole 120 into solenoid 14. Key 108 is next inserted into keyway 94 and rotated to pivot levers 100 to their unlocked positions whereupon spring 105 moves body 92 to the right in FIG. 2 until plate 104 closely confronts face 103 of the sleeve 88 in which position locking member 18 is out of the notch 20 thus freeing shaft 20 for rotation relative to casing 62. At this point, one of the discs 22 may be rotated until its conducting member 28 is out of alignment with the other conducting members thereby interrupting the circuit to the coil 80. As a result, armature 15 will drop into aperture 122 and aligned hole 121. In this position, shown in FIG. 2B, armature 15 blocks movement of lock 16 to the left thereby avoiding movement of locking member 18 into one of the notches 20 during use of the vehicle.

When the user wishes to relock the steering shaft 21 relative to the casing 62, discs 22 are again rotated until conducting members 28 are in alignment with contacts 72 and 78 whereupon armature 15 is again drawn into solenoid 14 thereby freeing the body 92 for axial movement in sleeve 88. By applying pressure on the end 124 of the body 92 against spring 105, body 92 may then be moved to the left in FIG. 2 until locking member 18 is in one of the notches 20. If locking member 18 is not initially aligned with one of the notches 20, the user need only rotate the steering wheel from side to side until locking member 18 slips into one of the notches as indicated by the fact that the user will no longer be able to rotate the steering wheel. In this position, the hole 120 is once again aligned with aperture 122. Thus, if the user then moves one of the discs 22 until its conducting member 28 is out of alignment with the other conducting members, the circuit to the coil 80 will again be interrupted and the armature 15 will fall into aperture 122 and aligned hole 120. As best shown in FIG. 7, levers 100 are arranged such that as the rear end of the body 92 moves past the face 103 of the sleeve 88, the levers 100 fall into their locking positions under the influence of gravity. Thus, the key 108 is not needed to lock the steering column.

It will be apparent that when the lock mechanism 10 is in the position illustrated in FIG. 2A, unauthorized tampering is effectively prevented. Thus, because the armature 15 extends into the keyway 94, it is impossible to insert a lock picking device into the keyway to operate levers 100. Also, because the end 124 of lock 16 is received in sleeve 88 when the steering shaft 21 is locked, it would be difficult if not impossible to get a grip on body 92 sufficient to pull it out of the sleeve. If someone does attempt to pull the body 92 out of the sleeve 88, he must not only rupture all four pairs of levers 100, but the armature 15 as well. Also, the annular flanges 44 and 46 preclude looking in between the discs 22 or jumping the conducting members 28 by inserting an electrically conductive plate or the like between adjacent discs 22. Nor can the conducting members 28 be located by inserting the leads of an ohmeter between the discs. Even if an unauthorized person could energize the coil 80 thus retracting armature 15 out of aperture 122 and aligned hole 120, it would still be impossible to rotate shaft 22 unless lever pairs 100 could be ruptured or rotated to their unlocked positions. It is thus apparent that the steering column lock 10 according to the present invention is substantially tamper proof. To further restrict tampering, housing 12, locking member 18, discs 22, annular flanges 44 and 46, shaft 50 and levers 100 all preferably comprise a rigid metal or metal alloy, such as case hardened steel.

Referring now to FIG. 8, the steering column lock 10' is in all respects identical to the steering column lock of FIGS. 1-7 save for the fact that key-operated lock 16 has been replaced by a cylindrical plug 130 having spaced radially extending holes 132 and 134. In the locked position, locking member 18 is disposed in notch 20 and armature 15 extends through aperture 122 into aperture 132 thereby blocking movement of the body 130 to the right. To unlock the steering shaft 21, the discs 22 are rotated to align conducting members 28 and contacts 72 and 78 as is more fully described above in connection with the lock 10 of FIGS. 1-7 thereby energizing coil 80 to retract armature 15. Coil spring 105 will then move body 130 to the right until the plate 104 abuts the face 103 of the sleeve 88 in which position the locking member 18 is retracted from the notch 20. The discs may then be rotated to interrupt the circuit to the coil 80 whereupon the armature 15 will move under the influence of gravity through aperture 122 and into aligned hole 134. This blocks body 130 against accidental movement to the left during vehicle use. To relock the steering shaft 21, the discs 22 are again rotated to energize the coil 80 thus retracting armature 15 from hole 134. By pushing on the end 136 of the body 130, the user may then move locking member 18 back into one of the notches 20 in which position hole 132 will again be aligned with aperture 122. If the discs 22 are then rotated to interrupt the circuit to the coil 80, the armature 15 will fall through aperture 122 into aligned hole 132 thereby again securing body 130 in the locked position. It will thus be apparent that the lock 10' of FIG. 8 is also substantially tamper proof.

Referring now to FIG. 9, a basic embodiment 10" of a steering column lock according to the present invention is illustrated. The steering column lock 10" does not include the key-operated lock 16 or its equivalent.

In lock 10", solenoid 14 is preferably supported midway between confronting side walls 70 of housing 60 as by support brackets (not shown). As shown, the armature 15 extends through the aperture 142 in casing 62 perpendicular to the shaft 21 whereby its free end is movable under the influence of gravity into one of the notches 20 when the coil 80 is deenergized. It will be apparent that when the armature 15 is in one of the notches 20, the steering shaft 21 is locked against rotation relative to casing 62. If the discs 22 are then rotated to a position wherein conducting members 28 and contacts 72 and 78 are aligned, coil 80 will be energized and armature 15 will be retracted from the notch 20 thus freeing shaft 21 for rotation.

As presently preferred and shown, armature 15 has a radially extending blind hole 144 which is aligned with an aperture 146 in one of the side walls 70 when armature 15 is in its retracted position. A bolt 148 having a head 150 extends through the aperture 146 such that the free end of the bolt may be moved into the hole 144. This prevents the armature 15 from slipping into one of the notches 20 during operation of the vehicle in the event the circuit to the coil 80 is interrupted by accidental rotation of the discs. Bolt 148 preferably includes an annular groove dimensioned for a snap fit with the defining wall of the aperture 146 when the free end of the bolt 148 is in the hole 144, the purpose being to insure that the bolt 148 remains in hole 144 as long as the vehicle is in use.

To re-lock the steering shaft 21, it is only necessary to pull the knob 150 to the right in FIG. 8 thereby freeing the armature 15 for movement relative to the shaft 21. If one of the discs 22 is then rotated to interrupt the circuit to the coil 80, the free end of the armature 15 will drop into one of the notches 20 thereby locking steering shaft 21. It will therefore be apparent that the lock 10" is also substantially tamper proof.

Having now described the preferred embodiments of a steering column lock according to the present invention, those skilled in the art will appreciate that various changes and modification may be made without departing from the spirit and scope of the invention. For example, those skilled in the art will appreciate that the ignition circuit may also be operated by the electrical combination lock 12. This alternative is schematically illustrated in FIG. 10 where the ignition switch comprises, for example, a relay.

It will also be apparent that the improved combination lock described above may be used as a switch for operating devices other than a solenoid incorporated in a steering column lock.

Since these as well as other changes and modifications are intended to be within the scope of the present invention, the above desciption should be construed as illustrative and not in a limiting sense, the scope of the invention being defined by the following claims:

I claim:

1. In a locking mechanism for a steering column of a vehicle having an energy source with a pair of terminals, said column including an outer casing and a concentric shaft having a notch therein, said locking mechanism being of the type including a locking member movable between a locked position wherein said locking member is disposed in said notch for restricting rotation of said shaft relative to said casing and an unlocked position wherein said locking member is out of said notch and said shaft is rotatable relative to said casing, the improvement comprising:

a plurality of discs having axially aligned through apertures therein, each of said discs having an electrically conductive member extending therethrough;

a supporting shaft extending through said apertures, said discs being freely rotatable about said supporting shaft;

a housing having an opening therein, means for securing said supporting shaft in said housing with the peripheries of of said discs extending through said opening;

means for connecting one of said electrically conductive members to one of said terminals and another of said electrically conductive members to the other of said terminals whereby said energy source, said connecting means and said contacts define a circuit, said circuit being closed when said electrically conducting members are aligned and open when said electrically conducting members are non-aligned;

a solenoid disposed in said circuit and responsive to said energy source;

an armature arranged for movement towards said solenoid when said circuit is closed and away from said solenoid when said circuit is open;

a sleeve extending through said casing below said armature, said sleeve having a through aperture therein in axial alignment with said armature in its range of movement;

a body having a pair of spaced holes disposed in said sleeve and having one end secured to said locking member, said body having a keyway and being movable in said sleeve between a first position wherein said locking member is in said locked position and one of said spaced holes is aligned with said aperture, said one spaced hole communicating with said keyway, and a second position wherein said locking member is in said unlocked position and the other of said spaced holes is aligned with said aperture, whereby when said circuit is open, said armature extends through said aperture and one of said aligned holes, said armature extending into said keyway when said aligned hole is said one hole;

a lever secured to said body for movement between an extended position wherein the lever protrudes outside the body and a retracted position wherein the lever is fully received in the body, said lever abutting the end face of said sleeve when said lever is in said extended position and said body is in said first position for blocking axial movement of said body; and a key insertable in said keyway in moving said lever to said retracted position.

2. The locking mechanism according to claim 1, and further comprising means for biasing said body to said second position.

3. The locking mechanism according to claim 2, wherein said biasing means comprises a spring connected at one end to said body and at the other end to said sleeve.

4. The locking mechanism according to claim 1, wherein the outer end of said body is fully received in said sleeve when said body is in said first position.

5. The locking mechanism according to claim 1, and further comprising an annular flange secured to both faces of at least one disc.

6. The locking mechanism according to claim 1, wherein said lever moves to said extended position solely under the influence of gravity.

* * * * *